Aug. 26, 1941.  J. A. CASSAVANT  2,253,844
EDUCATIONAL TRANSIT DEVICE
Filed July 31, 1940  2 Sheets—Sheet 1
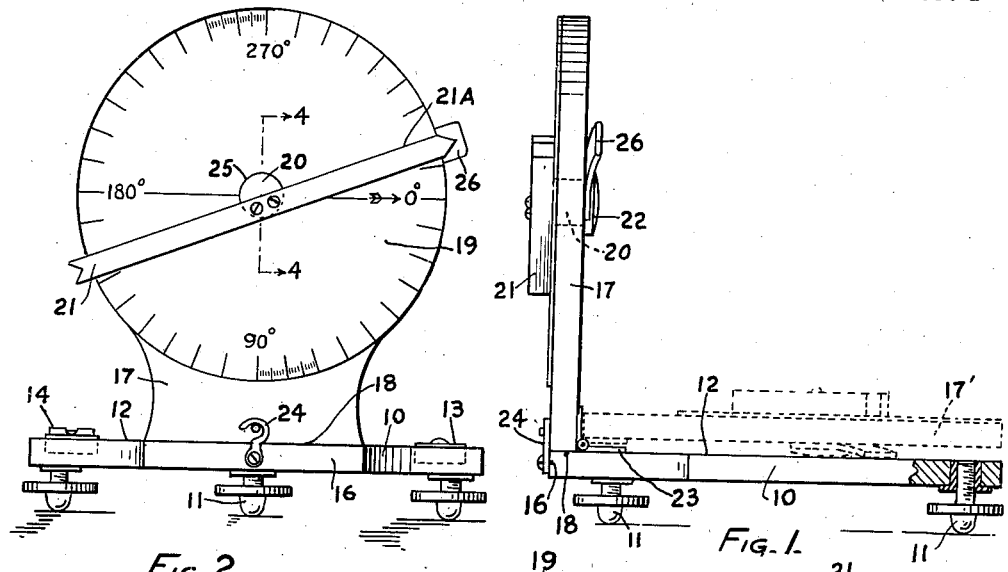
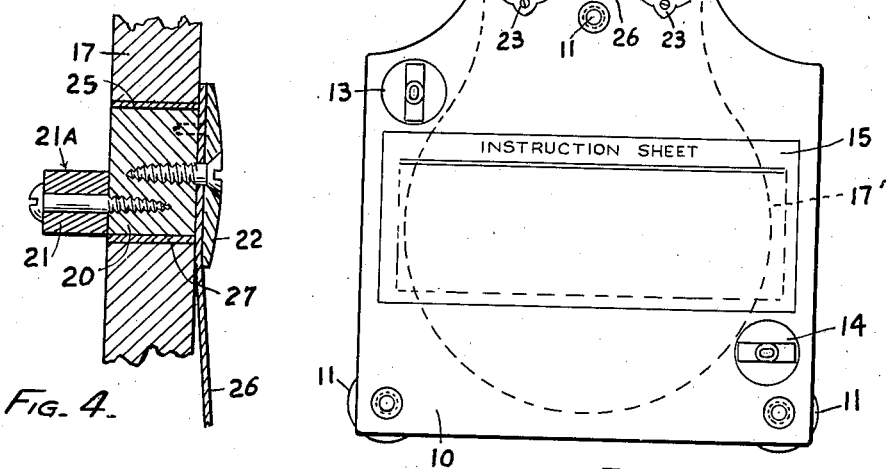
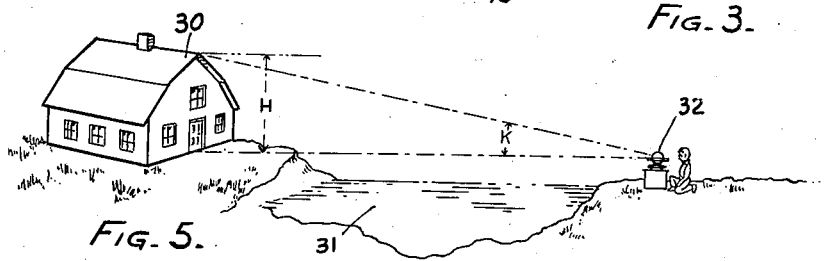
INVENTOR:
BY JOHN A. CASSAVANT.
Louis Illmer
ATTORNEY.

Aug. 26, 1941.          J. A. CASSAVANT          2,253,844
                    EDUCATIONAL TRANSIT DEVICE
                      Filed July 31, 1940          2 Sheets-Sheet 2
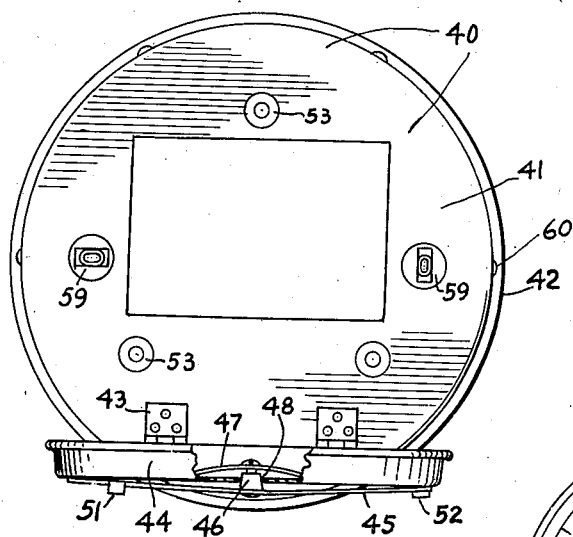
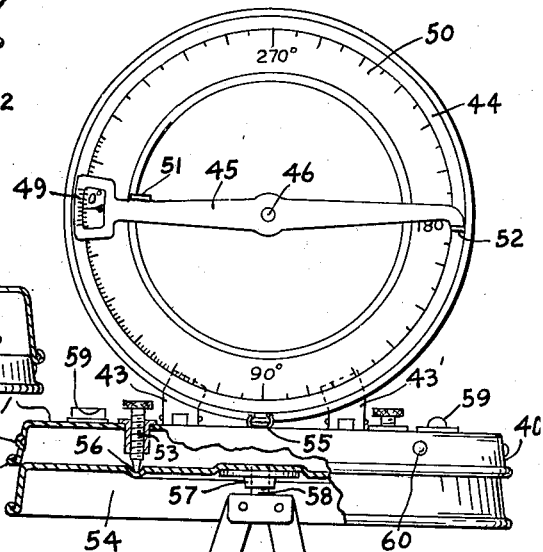
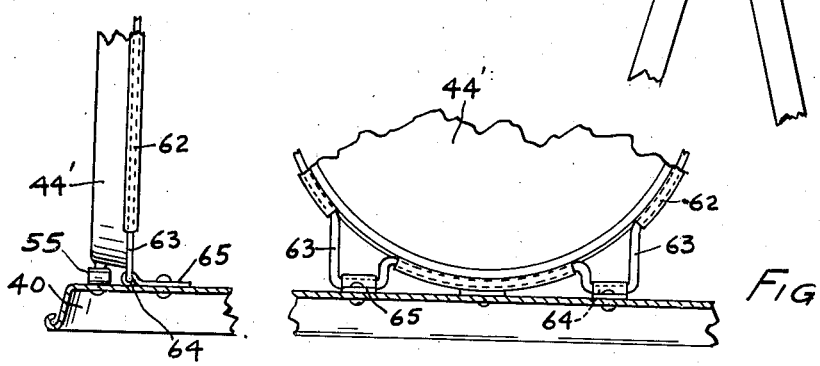
INVENTOR:
JOHN A. CASSAVANT
BY Louis Illmer,
ATTORNEY.

Patented Aug. 26, 1941

2,253,844

UNITED STATES PATENT OFFICE 2,253,844

EDUCATIONAL TRANSIT DEVICE

John A. Cassavant, McLean, N. Y.

Application July 31, 1940, Serial No. 348,852

4 Claims. (Cl. 33—70)

This invention relates to a simplified apparatus of the theodolitic type and which inexpensive but practical transit instrument has been more especially devised to teach novices some of the more evident uses thereof as a grade or range finder, also to impart a clearer concept of applied trigonometric relations by computing an unknown dimension from certain associated measured lengths and angles as observed by field work. In accordance with progressive teaching methods, such training technique and experimental procedure, arouses the play instinct and thereby incites more intensive effort particularly on part of boy and girl scouts, also advanced school children and others in striving to solve kindred mathematical problems with a real interest. Besides offering recreative activity as a toy, the underlying functional approach and its obvious application to every-day needs, are significant in that the results attained profoundly impress themselves upon the minds of juveniles and are readily recognized as having an unquestionably useful purpose.

As a low cost, rugged exemplification that shall fall well within the reach of juvenile purses, my foldable transit device essentially comprises a leveled computing table or the like base upon which a protractor disc may be hingedly erected in flap fashion. Said discal means is provided with a plain manipulative sighting bar in lieu of the usual telescope. Such bar is centrally pivoted about a horizontal axis within a graduated circle to determine the angular bar inclination with respect to a standardized zero reading position. When not in use, said device may be compactly folded flatwise for stowage.

The object of the present invention is to devise an inherently simple self-contained transit of the character indicated and to afford appropriate surveying facilities that are primarily intended to meet recreational, school and other educational needs.

Reference is had to the accompanying two sheets of drawings that are illustrative of alternative embodiments, and in which:

Fig. 1 represents an elevational side view of my erected transit assembly of the wooden type that is operatively set up for use, and Fig. 2 is a rear view thereof.

Fig. 3 shows a top view of Fig. 1, and Fig. 4 fragmentally details in enlarged scale, the bar trunnion mounting taken along 4—4 of Fig. 2.

Fig. 5 schematically depicts one of numerous like outdoor problems that may be solved by means of my transit device.

Fig. 6 is an erected top view of an alternative assembly of the sheet metal type, and Fig. 7 shows an elevational rear view thereof corresponding to Fig. 2.

Fig. 8 cross-sectionally represents such alternative transit device in its collapsed and covered condition.

Figs. 9 and 10 respectively detail in fragmental views, a modified pintle arrangement for my pivotally mounted protractor disc.

Referring in detail to the Figs. 1 to 5 disclosures, 10 designates a flat rectangular computing table or base platen of a pattern that may be fabricated from non-warpable plywood to include a rectilinear rear edge 16. Certain base corner regions may be upheld by a suitable support through interposed tripod feet such as 11 which may be screw adjusted to assure a perfectly level and centrally unobstructed top face 12 for said platen prior to utilizing the transit. To this end, mated spirit levels of the bubble type such as 13 and 14 may be sunk into said top face with the tubes thereof directed perpendicularly in the Fig. 3 manner. An instruction sheet 15 tabulates the more pertinent trigonometric constants and may be pasted to the upturned base face for reference. Such flat center region of my platen is also arranged to conveniently mount a writing pad thereon for recording pointer readings.

An apertured discal upright or dial plate 17 when made of relatively thick plywood, may be shaped to provide for a trued transverse bottom edge 18. The rear disc face may have a 360° protractor scale or dial 19 of paper mounted thereon that is accurately graduated in fractions of a degree. Such dial may be protectively covered by Celluloid. The axial center of said upright is preferably bored at 25 to receive a relatively short cylindrical trunnion 20 therethrough. To the rear trunnion end, there may be rigidly affixed a laterally offset cross bar 21 of which the rectilinear sighting edge 21A invariably aligns with the axial center of said trunnion as in Fig. 2. A relatively flat retaining flange 22 confines the trunnion against axial shift and may be fitted to permit the bar to be manipulatively rotated with the proper degree of frictional drag. If desired, a lever strap 26 may be inset into said flange to actuate the bar 21 from the opposite disc side. For its zero reading or normal reference line, the bar sighting edge is preferably but not necessarily arranged to lie in a truly horizontal direction as indicated in Fig. 2.

The rear edge region of the base plate may be equipped with a pair of inset flap hinges such as 23 adapted to guide the discal upright into a true perpendicular relation with respect to the leveled top face 12. The edge 18 is then brought into abutment with such face. A latch 24 allows of securing the erected upright against collapse about the hinge pintles. When unlatched, said upright may without flange interference be compactly folded into its dotted position 17' (see Fig. 1) for transportation.

The operation of my transit is kept extremely simple so that its function may readily be understood by immature students possessing a rudimentary knowledge of plain trigonometry but who wish to perfect themselves in the practical application thereof. As to the kinds of experimental problems which my instrument is primarily intended to solve, reference is had to Fig. 5. Here the total height H of the gabled house roof 30 with respect to its foundation, is assumed to be known from prior measurement. The student may then install his transit at some distance from this house such for instance as on the far side of a small lake 31. By successively sighting to the foundation line for a zero degree protractor reading, the angular divergence K may be surveyed. From such measured angle, the computed distance between the axis of the operatively set transit 32 and the front of said house can readily be arrived at with considerable accuracy. The necessary computations may be made upon the upturned top face 12 by the use of its instruction sheet 15.

As a modification, many other interesting experiments may be carried out by larger boys and girls themselves without need of expert supervision, such as determining the height of a tall tree, the width of a large barn or the like, all of which training combines healthy outdoor recreation with worth while scientific instruction. Analogous school room applications will be obvious to those skilled in this art.

Figs. 6 to 8 embody the same underlying transit principle for low cast productive fabrication in sheet metal. For this purpose, I preferably resort to a so-called baker's tin or the like dished base plate 40 having a circular flat outer platen face 41 provided with a depending flared rim flange whose endless edge may readily be smoothly curled at 42 by spinning or be beaded by dies to afford a relatively stiff tubular base reenforcement. The contour of such stamped base may also be given a square shape corresponding to that shown in Fig. 3 and have a stiffening wire imbedded within the hollow rim bead thereof.

Hingedly mounted upon such face, is a cross-sectionally dished protractor dial plate 44 that may be similarly formed of sheet metal but preferably has a rim diameter somewhat smaller than that of the base plate to erect said disc thereon. The mated flap hinges 43 and 43' may respectively have their corresponding leaves reversely warped so as to snugly fit interiorly of the flared disc rim. When collapsed, the disc and base may be made to fall into concentric relationship (see Fig. 8). When the protractor disc is erected, the center region of my upturned platen face 41 may again be utilized to record bar readings thereon. However the cited collapsible feature is not essential to the proper operation of my transit device, since the disc might also be rigidly attached to its base.

The sighting bar 45 is stamped from sheet metal and may have a conical trunnion or spindle 46 riveted to the center region thereof as fragmentally detailed in Fig. 6. Such bar may be slightly arched to frictionally drag at its ends for pointer retaining purposes. A leaf counter spring 47 may serve to yieldably urge the diverging trunnion end into the disc bore 48 and thereby impart sufficient frictional drag to retain my sighting bar in any set position. Such self-compensating conical trunnion also maintains greater accuracy on part of the pointer bar after extended wear in the guide bore of the thin disc. One terminal of the sighting bar may be given a rectangular loop formation or other suitable transverse enlargement and have a vernier graduation 49 disposed along one edge thereof to cooperate with the protractor scale or dial 50 as shown. The bar 45 may further be equipped with a pair of spaced sighting edge components 51 and 52 that are upturned to accurately align with the spindle axis in all rotative positions.

The base plate 40 may be provided with a plurality of bushed adjusting screws 53 uniformly distributed around the axial center of said plate. In the present instance, a cover plate 54 demountably carries the erected base plate thereon as a supported sub-base (see (Fig. 7). A snap clasp or the like latch device 55 may serve to retain the disc 44 against inadvertent collapse while in use. The exterior face of said cover plate may be provided with a groove or the like indentation 56 into which the respective depending screw tips are entered and thereby concentrically center the base plate with the underlying cover when the protractor disc 44 assumes its erected position. In order to conveniently support the assembled instrument for use, I preferably affix a depending socket 57 to the interior cover face which is intended to engage the threaded prop 58 of a conventional tripod.

The circular cover plate may be kept substantially identical in size and shape with the base plate except that the cover rim is made somewhat deeper in the Fig. 8 manner. By disengaging the clasp 55, the protractor disc folds downwardly over the spirit levels 59 and the adjusting screws 53. After unscrewing the tripod prop, the cover 54 may be telescopically superimposed upon the collapsed disc and base as shown. The base member 40 may be provided with a series of stop tits 60 to obviate binding when the cover is snugly nested thereon in stacked relationship. Such protective cover not only shields the more delicate working parts but affords a compact assembly for shipment and stowage. It will be obvious that when erected, both alternative models are substantially identical in functional performance.

In lieu of the described conventional leaf hinge 43, I may inbuild a pair of pintles into the protractor disc 44'. To this end, the beaded disc rim 62 may be spacedly slotted to provide for a pair of opposed sleevelike openings and have a double cranked rod 63 of bent U-shaped wire whose terminals are respectively inserted into the openings of such bead gaps in the offset bridgelike fashion schematically indicated in Figs. 9 and 10 to afford a pair of aligned disc pintles such as 64 that extend radially beyond the rim confines. These pintles respectively cooperate with the plain hinge straps 65 that may be struck out of the base plate or be affixed thereto as shown. The snap clasp 55 is preferably located intermediate said crank pintles in the region of nearest disc approach.

From the foregoing disclosure, it will be understood that the novel structural features of my transit device are subject to considerable modification in accomplishing the end in view, all without departing from the spirit and scope of my invention heretofore described and more particularly defined in the appended claims.

I claim:

1. A transit device having three circular similarly dished parts in sheet metal of which one such part comprises a base plate having a centrally cleared upturned platen adapted to mount a recording pad flatwise thereon and which platen is provided with a depending endless rim flange, a second part that comprises a foldable protractor dial plate having a diameter smaller than that of the platen and a marginal region of which dial plate is hinged to the base plate, and a bodily shiftable third part that comprises a cross-sectionally grooved cover element including a circumscribing flared rim flange that in alternative shift positions is nestable interiorly or exteriorly with respect to the rim flange of the first part and in one such nested position is arranged to serve as a supporting sub-base for the base plate when the dial is shifted into an erected position with respect to the base plate, adjustable screws entered through said platen and the tips of which screws demountably center into the cover groove when said cover serves as a sub-base, and manipulative bar means having a length approximately equal to the diameter of the dial plate and pivotally mounted in a centralized relation to the last named plate, said cover element in its other nested position being telescopically stackable upon the base plate and over said bar means when the dial plate is folded toward the base plate.

2. A three part educational transit device comprising a circular base plate member having a centrally cleared upturned platen adapted to mount a recording pad flatwise thereon and which platen is provided with a depending endless rim flange, a swingable protractor dial plate member arranged to lie flatwise upon said platen in substantial axial coincidence and the diameter of which dial plate is smaller than that of the base plate, double cranked pintle means extending radially beyond the perimetric confines of the dial plate to hingedly interconnect with the platen and allow the dial plate to unfold into stopped erected position and expose the platen center region for recording transit readings thereon, trunnion means extending through the center region of the dial member, a centrally apertured sighting bar having one trunnion end entered through the bar aperture and which bar is substantially equal in length to the diameter of the dial member, and a dished protective cover member stackable upon said base plate member in nested relation to the endless platen flange thereof to protectively conceal the sighting bar of the folded dial member.

3. A transit device comprising a base member provided with a medially unobstructed platen face adapted to mount a recording pad flatwise thereon, strap means carried by said face in a marginal region thereof, a substantially circular dial plate of sheet metal including a rim flange whose edge is curled into a tubular bead that is transversely slotted to constitute a pair of spaced gaps each provided with opposed sleeve openings, and a U-shaped double throw wire crank including a center pintle mounted within each such gap, the terminal regions of the respective cranks being inset into opposed openings contiguous thereto with the respective crank pintle disposed in axial alignment and extending beyond the confines of the beaded rim flange contour to hingedly cooperate with the strap means.

4. A transit device having three stackable cross-sectionally dished sheet metal parts adapted to be supported as a unit by a tripod provided with an upstanding shank, one such part comprising a circular base plate having a flat faced platen provided with a depending endless rim flange, a second part that comprises a foldable protractor dial plate having a diameter smaller than that of the platen and a marginal region of which dial plate is hinged to the base plate to fold flatwise upon said platen, and a bodily shiftable third part that comprises a cover element including a circumscribing flared rim flange which in alternative shift positions is nestable interiorly or exteriorly with respect to the rim flange of the first part and in one of such nested positions is arranged to serve as a supporting sub-base for the base plate when the dial is shifted into an erected position with respect to the base plate, socket means for said third part arranged to engage the tripod shank when said third part serves as a sub-base, and manipulative bar means pivotally mounted upon the dial plate, said cover element in another position being telescopically stackable upon the base plate when the dial plate is folded toward the base plate.

JOHN A. CASSAVANT.